Nov. 15, 1949 J. L. RUPP 2,487,831
STORAGE BATTERY WITH CONCENTRIC CELLS
Filed Oct. 17, 1944 2 Sheets-Sheet 1

INVENTOR.
JOHN L. RUPP
BY
Bean, Brooks, Buckley & Bean.

Nov. 15, 1949  J. L. RUPP  2,487,831
STORAGE BATTERY WITH CONCENTRIC CELLS
Filed Oct. 17, 1944  2 Sheets-Sheet 2

INVENTOR.
JOHN L. RUPP
BY
Bean, Brooks, Buckley & Bean.

Patented Nov. 15, 1949

2,487,831

UNITED STATES PATENT OFFICE 2,487,831

STORAGE BATTERY WITH CONCENTRIC CELLS

John L. Rupp, Williamsville, N. Y., assignor to National Battery Company, St. Paul, Minn.

Application October 17, 1944, Serial No. 559,002

9 Claims. (Cl. 136—14)

This invention relates to storage batteries, and has for one of its objects to provide a storage battery which is so shaped and constructed as to be adapted to be mounted in automotive vehicles or the like in improved manner.

Another object of the invention is to provide a storage battery which is of improved performance characteristics and less expensive to manufacture compared to batteries of prior art designs.

Another object of the invention is to provide an improved cylindrical cell type storage battery, whereby substantial savings of structural materials are effected and whereby the battery is adapted to function in improved manner compared to batteries of the prior art.

Another object of the invention is to provide a multiple cell type storage battery which is of compact and improved structural form whereby to require less space when mounted in an automotive vehicle or the like and whereby to be more resistant to strains tending to rupture the battery case and the plate elements thereof.

Another object of the invention is to provide an improved storage battery which is of lesser total weight for equal capacity, compared to batteries of the prior art. Another object of the invention is to provide a multiple cell storage battery comprising plate elements which are of improved form whereby the manufacture thereof is simplified and of reduced expense. Another object of the invention is to provide a storage battery embodying improved means for mounting and detachably fastening the battery in mounted position upon an automotive vehicle or the like.

Other objects and advantages of the invention will appear in the specification hereinafter.

Figure 1:
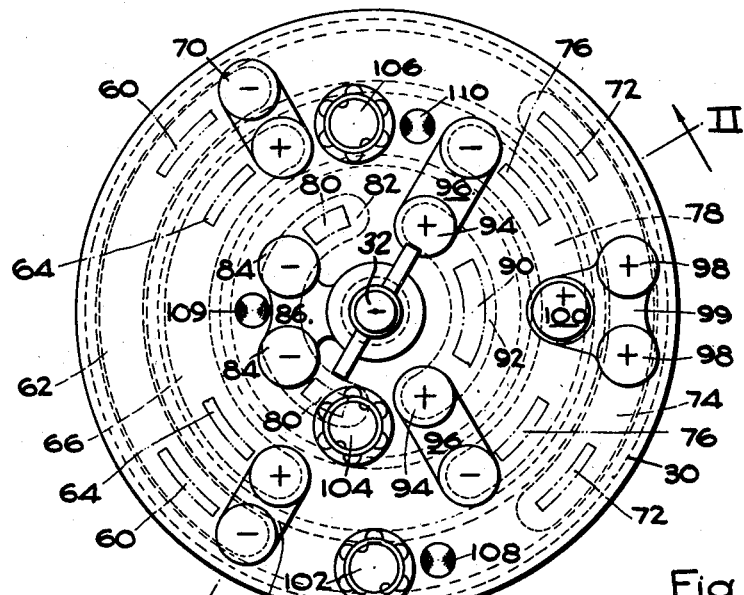
Fig. 1 is a top plan of a battery of the invention.

The drawing illustrates the invention in conjunction with a storage battery case which is designated generally 10 and comprises a cylindrical casing molded of any suitable acid-resistant material such as hard rubber or glass or the like to include an annular bottom portion 12; an inner cylindrical wall 14; an outer cylindrical wall 16; and a pair of partitioning walls 18, 20 which are relatively spaced and disposed concentrically of the inner wall 14 to divide the interior of the battery case 10 into three separate and concentric compartments which are designated 22, 24, 26, respectively. It will be understood that the battery case bottom and wall portions may be integrally formed from a suitable thermoplastic material by simple molding process or the like, and that the battery case so provided is externally of cylindrical form except for the open chamber 28 which extends vertically through the center of the case. A battery case cover plate 30 of generally circular form is also molded from similar material and is annularly grooved at its bottom face so as to be adapted to slip-fit down upon the upper edges of the battery case wall elements 14—16—18—20. The cover 30 is arranged to be suitably cemented or fused or otherwise fixed upon the case 10 subsequent to complete assembly of the battery structure, as will be explained hereinafter, to provide liquid and vapor proof connections between the battery case walls and the cover plate.

Thus, the single battery case provides in a single compact unit a group of three relatively concentric battery cells 22—24—26, each of which are annular in horizontal section. The partition walls 14—16—18—20 are so relatively positioned radially of the battery case unit as to provide the three acid cells so be of the same volumetric capacity; and it will therefore be appreciated that the battery case of the drawing provides a three-cell battery unit which is of improved shape in plan form whereby to be adapted to be mounted in the engine compartment of an automotive vehicle or the like in space-saving manner. The cover plate 30 of the battery case is centrally perforated so that the completed battery is adapted to be slip-fitted downwardly about a bolt or the like as indicated at 32, which bolt may be mounted to extend vertically from a battery supporting base portion 34 (Fig. 2) of the appliance which is to mount the battery. A tapered ferrule 36 will be preferably fitted upon the lower end of the bolt 32 for centering the battery in snug-fitting mounted position upon the base; and a washer 38 will be preferably mounted upon the cover 30 to receive the bearing pressures of a wing nut 40 or the like which is mounted in screwthreaded relation upon the upper end of the bolt 32 to provide for detachable locking of the battery upon the base 34.

Figure 2:
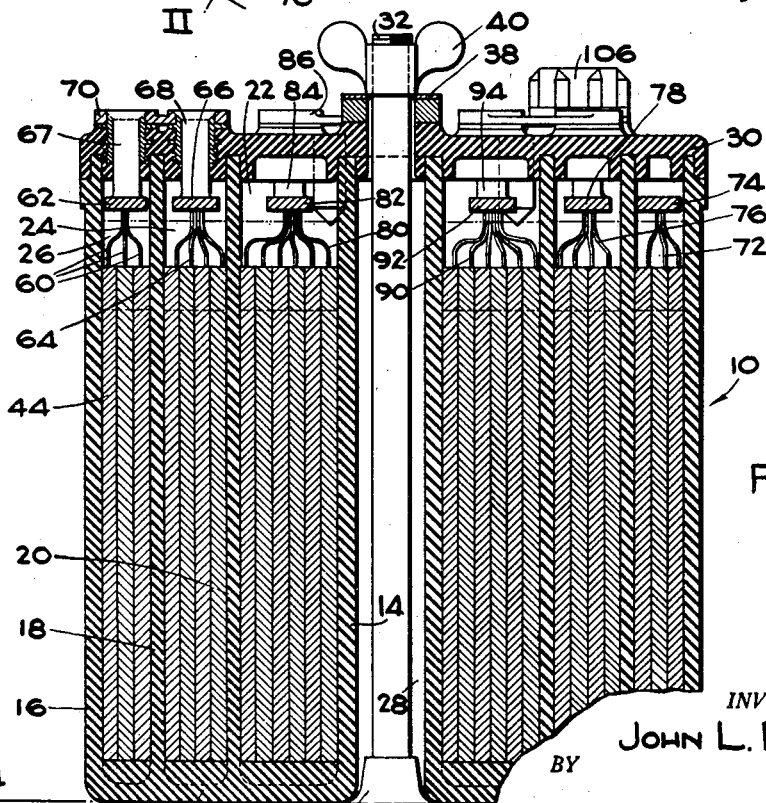
Fig. 2 is a vertical section, as along line II—II of Fig. 1.
Figure 3:
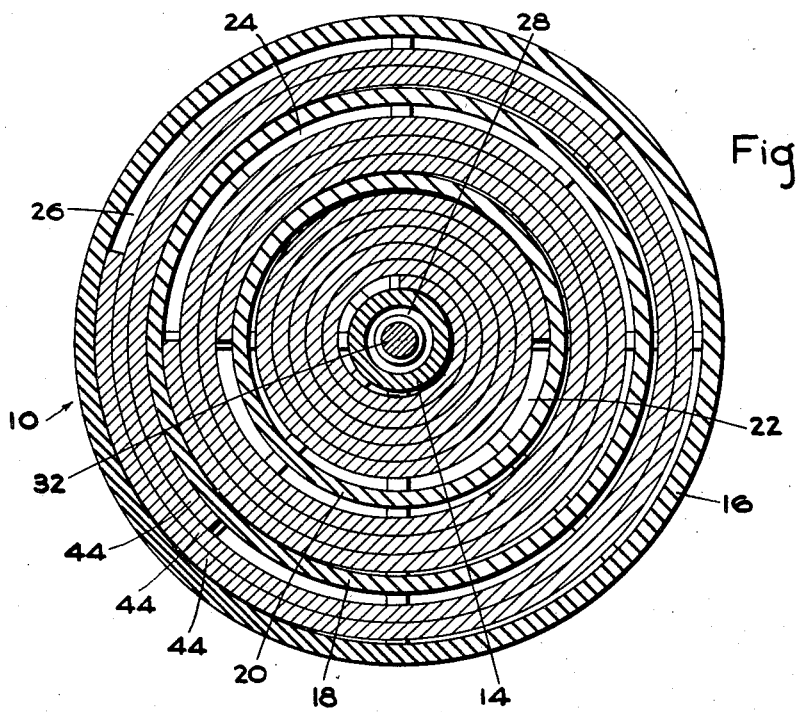
Fig. 3 is a typical horizontal section through the battery of Figs. 1-2, looking down into the battery case from below the top elevations of the plate elements thereof.

As illustrated in Figs. 2–3, the battery plate elements comprise in the case of each of the cells a single unitary strip element which is prefabricated to comprise a plurality of laminae as will be explained hereinafter and then rolled into generally cylindrical form so as to be adapted to be slip-fitted into the respective cells of the battery case to substantially occupy the spaces therein. Due to the different perimetric dimensions of the various cells, different numbers of wraps of the plate sheet material are required to provide equal total lengths of plate elements in the respective cells. Therefore, the necessary radial thicknesses of the outer cells are less than in the case of the inner cells. For example, as shown in Fig. 3, equal lengths of fabricated plate stock 44 may be accommodated by coiling approximately 2¼ wraps of the plate stock 44 into the outer cell 26; three wraps of the stock 44 into the center cell 24; and 6 wraps of the stock 44 into the inner cell 22.

As shown in Fig. 3, a particular feature and advantage of the battery case construction of the invention is that the central wall element 14 serves a double function of sealing the inner cell liquid from the mounting bolt space and acting as a mandrel for supporting the coiled plate element of the inner cell in firm bearing relation against the partition wall 20. Because of this mode of support of the coiled plate element within the inner cell, the plate element is prevented from becoming partially uncoiled in such manner as to permit spreading of adjacent wraps of the coiled plate element, such as would disrupt the uniformly contiguous plate coil arrangement required for optimum electromotive performance of the battery. Similarly, the partition walls 20—18 cooperate to maintain the coiled plate element of the middle cell in firmly coiled and wrap-contiguous relation; and the partition wall 18 and the outer wall 16 similarly cooperate to support the coil plate element of the outer cell in optimum performance condition.

Figure 4:
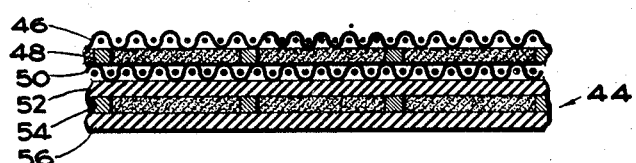
Fig. 4 is a greatly enlarged fragmentary section through a single composite plate element of the battery.

As explained hereinabove, the battery plate coil stock material is prefabricated in simple laminated strip form prior to being cut into suitable lengths for subsequent coiling and positioning within the battery cells. The battery plate stock may comprise any suitable positive plate and negative plate and separator devices such as are illustrated in Fig. 4 to consist of consecutive layers comprising a relatively porous glass fabric insulator 46; a positive grid 48; a relatively porous woven glass fabric insulator 50; a wood veneer or microsopically porous hard rubber separator 52; a negative grid 54; and a wood veneer or microscopically porous hard wood separator 56. It will be understood of course that the positive and negative grid elements will comprise perforated lead plates or fabric devices carrying chemically active materials known in the trade as "paste," and that the positive grid insulators 46—50 and the separator elements 52—56 may be provided of any suitable materials other than the materials mentioned hereinabove. Or, the plates may be formed of sheet lead, either flat or perforated or crimped, or the like; the activating material of which will have been formed electrochemically by passing electric current from positive to negative plates through an electrolyte containing suitable accelerators. The insulating elements for these electrochemically formed plates may be of the same nature as hereinabove described.

In any case the composite plate stock 44 will be prefabricated in contiguous strip or sheet form and then cut into suitable widths and lengths and rolled upon itself in such manner that the separator element 56 is disposed at the inside of the roll. This will dispose the positive and negative grid elements to be alternately positioned radially of each battery cell and to be suitably separated by the insulative and separator elements referred to. Thus, it will be appreciated that in the battery of the invention there will be an increased proportion of opposite polarity battery grid arrangements relative to the total areas of the positive and negative grid elements; and that therefore a battery of improved electromotive characteristics for equal battery plate total area is provided.

As indicated at 60—60 in Figs. 1–2, lead plate conductor leads formed integrally with the negative plate elements of the outer cell are provided to extend upwardly into fused connection with a bus bar 62 disposed adjacent the underside of the cover plate 30 and extending perimeterally of the outer cell approximately ⅓ of the distance therearound. Adjacent portions of the positive plate elements of the middle cell are formed with lead plate leads 64 which are fused into connection with a corresponding bus bar 66 at the top of the middle cell and under the cover plate. Conductors 67—68 lead respectively from the bus bar 62—66 through suitably perforated and vapor-sealed portions of the cover plate 30 and into welded connections with cross bars 70—70 at the top surface of the cover 30. At the opposite side of the battery case the positive plate elements of the outer cell are provided with leads 72 connecting to a bus bar 74; and the negative plate elements of the middle cell are provided with leads 76 connecting to a bus bar 78. The negative plate elements of the center cell are provided with similar leads 80 connecting to a bus bar 82 at the left hand side of the battery as viewed in Figs. 1–2, and a pair of conductors 84 extend upwardly through the battery case cover into connection with a spider 86 leading to the metal washer 38 at the center of the battery case top. Thus, the wing nut 40 and the spider 86 and the bolt 32 provide together a convenient connection device for the cable connection to the negative terminal of the battery.

The positive plate elements of the inner cell are provided with leads 90 connecting to a bus bar 92 which in turn connects through conductors 94—94 and cross plates 96—96 to connections with corresponding opposite ends of the bus bar 78 of the center cell. A pair of conductors 98—98 extend vertically from the bus bar 74 through the battery case cover into electrical connection with a spider plate 99 which carries the positive terminal post 100 of the battery. Thus, it will be understood that the cells of the battery are thereby connected in series with the battery external connector terminals 38—100; and that cable devices for working connection with the battery may then be simply connected to the terminal devices 38—100. It will of course be understood that the plates and interconnecting conductor devices may, if preferred, be arranged to provide the spider 86 at the center of the battery to constitute the positive terminal thereof instead of the negative terminal as described hereinabove. Also, it will be understood that the terminal device at the center of the battery may be readily arranged to provide a "ground" connection through an electrical connection to the metal bolt 32; whereby only one cable to the terminal 100 will be required to complete the battery circuit.

Inasmuch as the battery grid and connector lead portions are desirably made of standard thickness lead plate stock, and inasmuch as the different cells of the battery contain different numbers of wraps of battery plate elements, as shown in Fig. 1, it is preferable to provide the battery plate leads 60—64—72—76—80—90 to be of different plan view lengths perimeterally of the battery cells. Thus, for example, in order to provide the conducting lugs from the positive and negative grids of each cell to have the same total sectional areas so as to be of equal conductivity characteristics the conductors 60 may be as shown for example in the drawing approximately 1" each in plan view length; the conductors 64 approximately ¾" in length; the conductors 72 approximately 1" long; the conductors 76 approximately ¾" long; the conductors 80 approximately ½" long; and the conductors 90 approximately 1" long. This arrangement of plate elements and plural conductors leading in parallel from the plates to the bus bars divides the current loads which would otherwise necessarily travel throughout the relatively extended lengths of the coiled plate elements to accumulate at single take-off points, so that the plate elements in the case of the present invention may be constructed of minimum thicknesses to provide optimum electro-chemical efficiencies.

Figure 5:
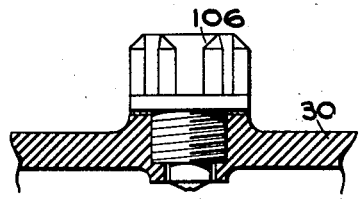
Fig. 5 is an enlarged detail, with portions shown in vertical section, through a filling port and plug device in the battery case cover.
Figure 6:
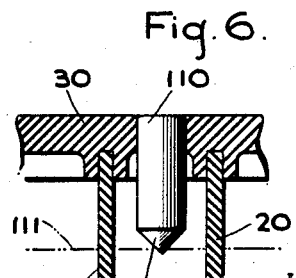
Fig. 6 is a fragmentary vertical section on an enlarged scale through a portion of the battery case cover, showing a battery liquid level indicator device in elevation.

As illustrated at 102; 104; 106, respectively, and as shown in more detail in Fig. 5, a liquid filler and gas vent opening and plug device will be provided in conjunction with each cell of the battery. It will be understood of course that any suitable venting and filling plug arrangement may be employed for this purpose; but it is preferred to arrange the filling-openings as shown in the plan view drawing of Fig. 1 so as to avoid interference with the conductor elements of the battery. Also, as shown at 108; 109 and 110 in Fig. 1, and in further detail in Fig. 6, a liquid level indicator is preferably provided in conjunction with each of the cells of the battery, and is shown to comprise a rod of glass or other transparent material which is press-fitted into a suitably apertured portion of the battery case cover 30 to extend from a substantially flush position at the top of the battery case downwardly to the storage level 111 of the liquid electrolyte within the cell. The bottom end of the glass rod is conically shaped as shown at 112, and whenever the electrolyte liquid is in contact with the bottom end of the indicator the upper end thereof will appear to be darkened; but whenever the liquid level descends away from contact with the bottom end of the indicator the upper end thereof brightens in response to reflection of the light entering the upper end of the indicator and passing downwardly into reflecting relation against the lower conical end portion thereof and back again so as to illuminate the upper end of the indicator.

Although only one form of the invention has been shown and described in detail it will be apparent to those skilled in the art that the invention is not so limited but various changes may be made therein without departing from the spirit of the invention or the scope of the appended claims.

I claim:

1. A storage battery comprising a single case of cylindrical form having concentric integral partition walls therein dividing the interior of said casing into a plurality of concentrically positioned annular battery cells, each of said cells having a plate element unit comprising separate positive and negative grid members carrying electro-chemically active material, separator means of microscopically porous sheet form disposed between said positive and negative plate members, relatively porous insulting sheet members at opposite sides of said positive plate member, each of said battery elements being fabricated as laminated sheets and coiled into circularly wrapped forms so as to be adapted to slip-fit into the corresponding battery case cell and to occupy the interior thereof in compactly nested manner, conductor devices extending from edge portions of said plate members at intervals therealong into connection with bus bars of like polarity, said bus bars being arcuately shaped and disposed above the level of electrolyte liquid within said battery case and extending substantially parallel to the perimetric shape of the wrapped edge portions of said plate members, a battery case cover sealed to the upper edges of the battery case and to the partition wall elements and overlying said bus bars, electrical conductors connected to said bus bars and extending through said battery case cover in fluid tight mounted relation therein, and a plurality of cross plates interconnecting unlike polarity conductors of adjacent cells in series and terminating respectively at positive and negative terminal post devices.

2. A storage battery comprising a single case of cylindrical form having concentric integral partition walls therein dividing the interior of said casing into a plurality of concentric annular battery cells, each of said cells having a plate element unit comprising separate positive and negative grid members carrying electro-chemically active material, microscopically porous separator means of sheet form disposed between said positive and negative plate members, relatively porous insulating sheet members at opposite sides of said positive plate member, and conductor devices extending from edge portions of said plate members at intervals therealong into separate connection with terminal devices of corresponding polarity.

3. A storage battery comprising a single case of cylindrical form having concentric integral partition walls therein dividing the interior of said casing into a plurality of separate concentric battery cells, each of said cells having complete positive and negative grid units therein carrying electro-chemically active material, microscopically porous separator means of sheet form disposed between said positive and negative grid units, relatively porous insulating sheet members at opposite sides of said positive grid unit, each of said grid units being coiled into circularly wrapped forms and slip-fitted into the corresponding battery case cell to occupy the interior thereof in compactly nested manner, and conductor devices extending from edge portions of said grid units into connection with terminal devices of like polarity.

4. A storage battery comprising a single case of cylindrical form having means therein dividing the interior of said casing into a plurality of concentrically positioned annular battery cells, each of said cells having a plate element unit comprising separate positive and negative grid members carrying electro-chemically active material, microscopically porous separator means of sheet form disposed between said positive and negative plate members, relatively porous insulating sheet members at opposite sides of said positive plate member, each of said battery elements being fabricated as laminated sheets and coiled into circularly wrapped forms and slip-fitted into the corresponding battery case cell to occupy the interior thereof in compactly nested manner, and conductor devices extending from edge portions of said plate members into connection with terminal devices of like polarity.

5. A storage battery comprising a case of annular form having its interior divided into a plurality of concentrically positioned annular battery cells of progressively decreasing sectional width dimensions commencing with the innermost cell and counting outwardly therefrom, each of said cells having a plate element unit comprising separate positive and negative grid members carrying electro-chemically active material and separator means disposed between said positive and negative plate members, said plate element units being of similar construction and of equal length and thickness dimensions and helically wound within the respective cells into coils having progressively varying numbers of overlapping convolutions, the innermost cell having the largest number of overlapping convolutions, and conductor devices extending from said plate members into connection with terminal devices of like polarity.

6. A storage battery comprising a single case of cylindrical form having integral bottom and concentric partition walls therein dividing the interior of said casing into a plurality of concentrically positioned annular battery cells, said bottom wall being apertured centrally thereof, a tubular wall device extending through said battery case in open communication with said apertured bottom portion, each of said cells having a plate element unit comprising separate positive and negative grid members and separator means between each adjacent positive and negative grid member, said plate element units being coiled into circularly wrapped forms and slip-fitted into the corresponding battery case cells to occupy the interior thereof in compactly nested manner, and conductor devices extending from said plate members into connection with terminal devices of like polarity.

7. A storage battery comprising a single case of cylindrical form having concentric integral partition walls therein dividing the interior of said casing into a plurality of concentric annular battery cells, each of said cells having a plate element unit comprising separate positive and negative grid members carrying electro-chemical active material, microscopically porous separator means of sheet form disposed at both sides of said positive and negative plate members, and conductor devices extending from edge portions of said plate members at intervals therealong into separate connection with terminal devices of corresponding polarity.

8. A storage battery comprising a single case of cylindrical form having concentric integral partition walls therein dividing the interior of said casing into a plurality of separate concentric battery cells, each of said cells having complete positive and negative grid units therein carrying electro-chemical active material, microscopically porous separator means of sheet form disposed at both sides of said positive and negative grid units, each of said grid units being coiled into circularly wrapped forms and slip-fitted into the corresponding battery case cell to occupy the interior thereof in compactly nested manner, and conductor devices extending from edge portions of said grid units into connection with terminal devices of like polarity.

9. A storage battery comprising a single case of cylindrical form having means therein dividing the interior of said casing into a plurality of concentrically positioned annular battery cells, each of said cells having a plate element unit comprising separate positive and negative grid members carrying electro-chemical active material, microscopically porous separator means of sheet form disposed at both sides of said positive and negative plate members, each of said battery elements being fabricated as laminated sheets and coiled into circularly wrapped forms and slip-fitted into the corresponding battery case cell to occupy the interior thereof in compactly nested manner, and conductor devices extending from edge portions of said plate members into connection with terminal devices of like polarity.

JOHN L. RUPP.

REFERENCES CITED

The following references are of record in the file of this patent:

UNITED STATES PATENTS

| Number | Name | Date |
| --- | --- | --- |
| 614,012 | Koenig | Nov. 8, 1898 |
| 1,173,651 | Crowdus | Feb. 29, 1916 |
| 1,525,759 | Pernot | Feb. 10, 1925 |
| 1,622,230 | Poillon | Mar. 22, 1927 |
| 1,883,971 | Kryzanowsky | Oct. 25, 1932 |
| 2,061,899 | Domizi | Nov. 24, 1936 |
| 2,185,829 | Burgess | Jan. 2, 1940 |
| 2,361,533 | Endress et al. | Oct. 31, 1944 |